(No Model.)  2 Sheets—Sheet 1.
W. C. BIBB, Sr.
SEED PLANTER.
No. 285,558. Patented Sept. 25, 1883.
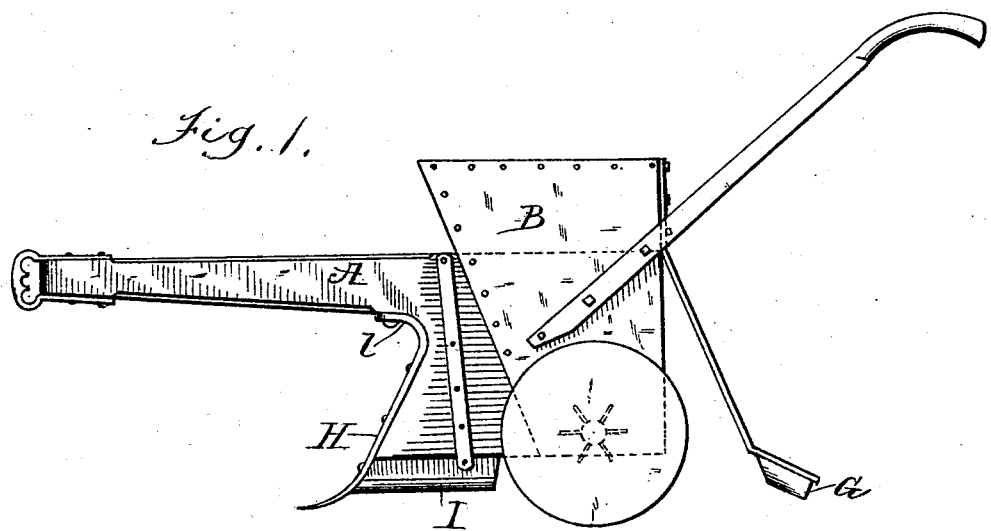
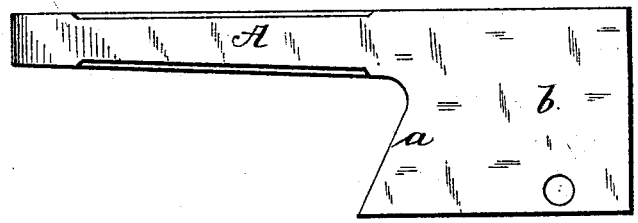
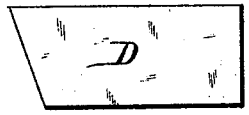
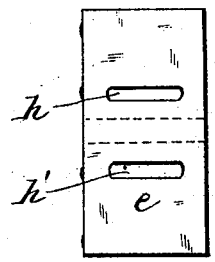
Attest:
Walter Fowler
Wm. A. Schoenborn
Inventor;
Wm. C. Bibb Sr.
per atty
A. H. Evans & Co (No Model.) 2 Sheets—Sheet 2.

W. C. BIBB, Sr.
SEED PLANTER.

No. 285,558. Patented Sept. 25, 1883.

Attest;
T. Walter Fowler
Wm A. Schoenborn

Inventor;
Wm C. Bibb Sr
per atty
A H Evans & Co

UNITED STATES PATENT OFFICE.

WILLIAM C. BIBB, SR., OF ATLANTA, GEORGIA.

SEED-PLANTER.

SPECIFICATION forming part of Letters Patent No. 285,558, dated September 25, 1883.

Application filed January 16, 1883. (No model.)

*To all whom it may concern:*

Be it known that I, WILLIAM CRAWFORD BIBB, Sr., of Atlanta, in the county of Fulton and State of Georgia, have invented a new and Improved Cotton-Seed Planter and Fertilizer-Distributer; and I hereby declare the following to be a full, clear, and exact description of the same, reference being had to the accompanying drawings, making part of this specification, in which—

Figure 2:
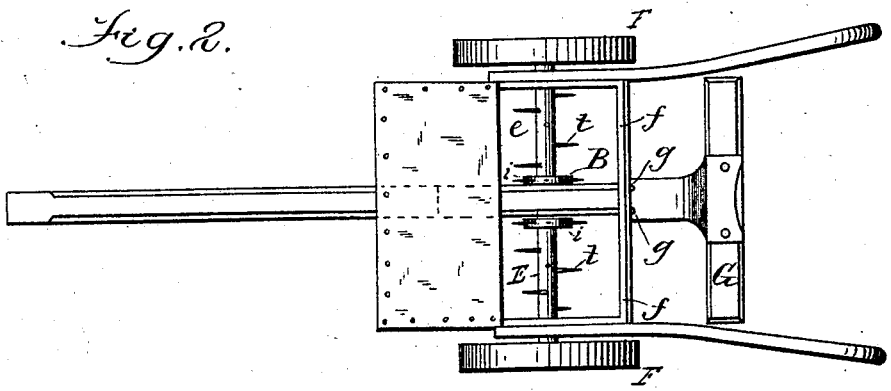
Figure 6:
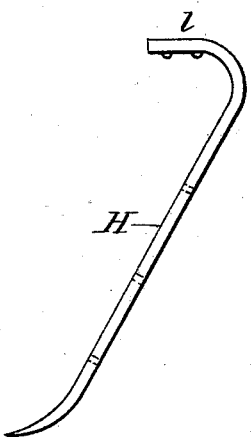
Figure 7:
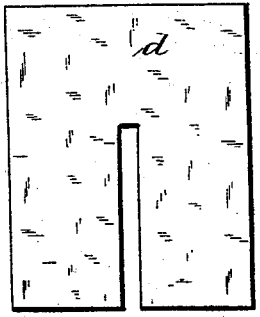
Figure 8:
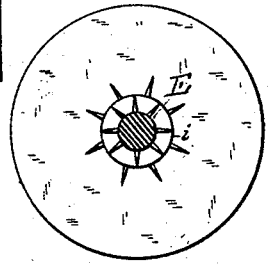

Figure 1 is a side elevation of the device. Fig. 2 is a plan of the planter. Figs. 3, 4, 5, 6, 7, 8 are details of the parts.

My invention relates to a planter for planting cotton-seed and distributing fertilizers; and it consists in sundry details of construction and arrangement of parts, as hereinafter fully described and specifically claimed.

In order that those skilled in the art may make and use my invention, I will proceed to describe the manner in which I have carried it out.

In the said drawings, A represents the beam of the implement, which is in one solid piece with the plow-support $a$ and division-board $b$, which separates the seed-receptacle from the fertilizer-receptacle in the hopper B. The hopper is made with a diagonal front, composed of a slotted board, $d$, the portion $b$ of the combined beam, plow-support, and division-board passing through the slot in board $d$, resting on the bottom $e$, and abutting against the back of the hopper $f$, where it is secured by bolts or screws $g\ g$. On each side of the central division, $b$, the bottom is provided with a slot, $h\ h'$, through which respectively are fed the fertilizer and the cotton-seed. A piece, D, corresponding to the outline of the hopper, is placed within it on the upper edge of $b$, to complete the division of the hopper to a line flush with the top of the hopper.

The axle E passes through the sides of the hopper and through $b$, and has on its ends the wheels F F. Spur-wheels $i\ i'$ on the axle project through the slots $h\ h'$ and force the fertilizer and seed through the bottom of the hopper, whence it falls into the furrow and is covered by the shoe G, which projects from the rear of the machine, as shown.

To the front of the plow-support $a$ is secured the share H, the upper end of which is curved forward at $l$ into a brace, which is bolted to the inner end of the beam A. Immediately behind the share H travels a shoe, I, which smooths the bottom of the furrow to receive the seed. Teeth $t\ t$ or stirrers are inserted in the axle along its length to stir up and agitate the fertilizer and seed, so they will feed freely.

Having thus described my invention, what I claim as new, and desire to secure by Letters Patent, is—

In a seed-planter, the beam A, plow-support $a$, and division-board $b$, made in a single piece, as set forth.

WILLIAM CRAWFORD BIBB, SR.

Witnesses:
ANDREW J. WEST,
JOHN F. BARCLAY.